(12) United States Patent
Kuwano (10) Patent No.: US 9,796,217 B2
(45) Date of Patent: Oct. 24, 2017

(54) PNEUMATIC TIRE

(71) Applicant: TOYO TIRE & RUBBER CO., LTD., Osaka-shi, Osaka (JP)

(72) Inventor: Shingo Kuwano, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 299 days.

(21) Appl. No.: 14/669,883

(22) Filed: Mar. 26, 2015

(65) Prior Publication Data

US 2015/0306918 A1    Oct. 29, 2015

(30) Foreign Application Priority Data

Apr. 25, 2014 (JP) ................................. 2014-091745

(51) Int. Cl.
*B60C 11/13* (2006.01)
*B60C 11/04* (2006.01)

(52) U.S. Cl.
CPC ........ *B60C 11/1369* (2013.01); *B60C 11/045* (2013.01); *B60C 11/047* (2013.01); *B60C 11/1307* (2013.01); *B60C 2011/133* (2013.01)

(58) Field of Classification Search
CPC .................. B60C 11/13; B60C 11/1307; B60C 2011/133; B60C 2011/1338; B60C 11/1353; B60C 2011/1361; B60C 11/1369; B60C 11/24; B60C 11/04; B60C 11/042; B60C 11/047; B60C 11/11; B60C 11/0309; B60C 11/0316; B60C 11/032; B60C 2011/0346; B60C 11/045

USPC .............. 152/209.22, 209.19, 209.21, 154.2, 152/DIG. 1

See application file for complete search history.

(56) References Cited

U.S. PATENT DOCUMENTS

2006/0016536 A1* 1/2006 Maxwell ................. B60C 11/11
152/209.18
2010/0243116 A1* 9/2010 Yasunaga ................ B60C 11/24
152/154.2

FOREIGN PATENT DOCUMENTS

JP     2009-227154    * 10/2009
JP     2010-234559 A    10/2010

* cited by examiner

*Primary Examiner* — Eric Hug
(74) *Attorney, Agent, or Firm* — Westerman, Hattori, Daniels & Adrian, LLP (57) ABSTRACT

The pneumatic tire has main grooves; land portions which are sectioned by the main grooves; paired notches which face to each other as well as being open to a tread surface; the notches being concave portions which are formed in side surfaces of two land portions which are adjacent across the main grooves; tie bars which protrudes at a predetermined height from groove bottoms of the main grooves and connect between the paired notches; and dimples which are provided in the middle in a width direction of the tie bars. The dimples are arranged at least in a notch internal region which is surrounded by wall surfaces of the notches among the tie bars.

3 Claims, 12 Drawing Sheets

PNEUMATIC TIRE

BACKGROUND OF THE INVENTION

Field of the Invention

The present disclosure relates to a pneumatic tire in which a main groove extending in a tire peripheral direction is formed in a tread portion, and a tie bar protruding at a predetermined height is formed in a groove bottom of the main groove.

Description of the Related Art

Figure 11A:
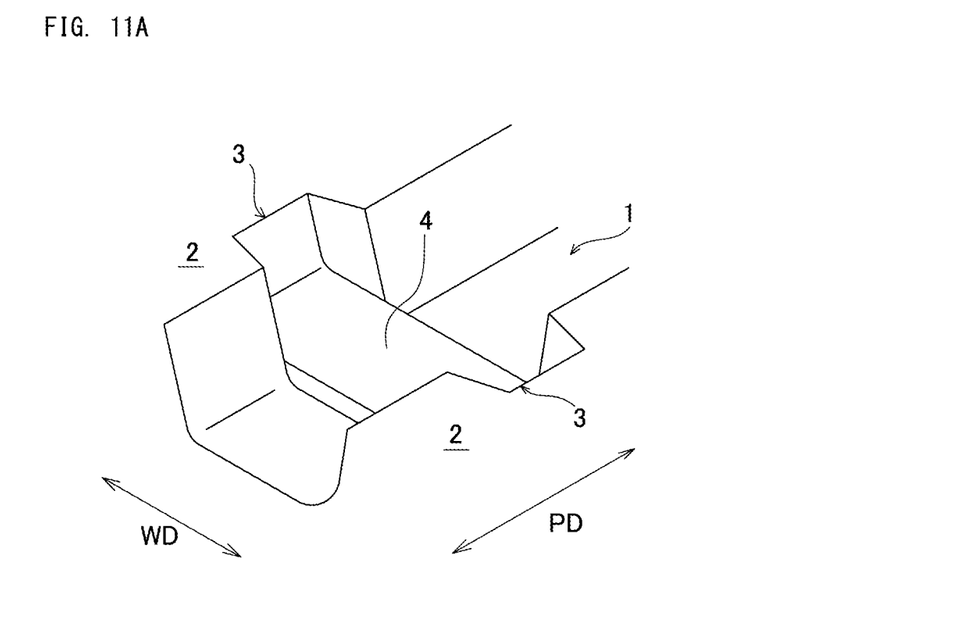
FIG. 11A is an enlarged perspective view showing a notch and a tie bar in a conventional pneumatic tire.

As shown in FIG. 11A, in a pneumatic tire having a main groove 1 which extends in a tire peripheral direction PD, and land portions 2 which are comparted by the main groove 1, in a tread portion, it can be thought that a pair of notches 3 which are open to a tread surface and are concave portions are formed at mutually facing positions, in side surfaces of two land portions 2 which are adjacent across the main groove 1, for improving a traction.

Figure 11B:
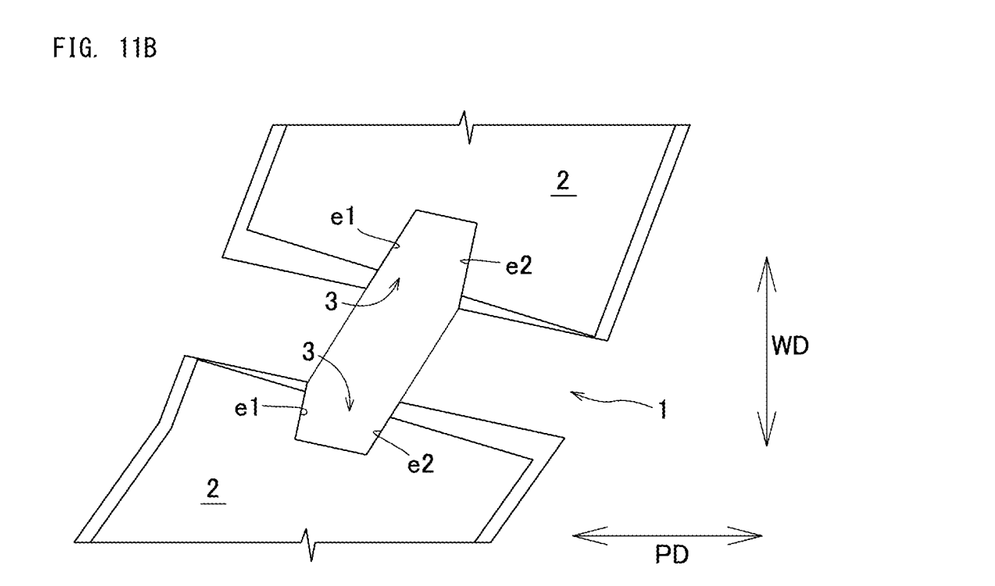
FIG. 11B is an enlarged plan view showing the notch and the tie bar according to the embodiment in FIG. 11A.

In the structure in which the notches are formed in the land portions, a difference is generated between an energy which acts on an edge e1 in a step-in side of the notch 3 and an energy which acts on an edge e2 in a kick-out side, as shown in a plan view in FIG. 11B. As a result, a so-called uneven wear that an amount of wear of the both is biased tends to be generated. In order to reduce the difference of the energies acting on both the edges so as to suppress the uneven wear, there can be thought a structure in which a tie bar 4 protruding at a predetermined height from a groove bottom of the main groove 1 is provided, and the tie bar 4 connects between the paired notches 3, as shown in FIGS. 11A and 11B.

Although the purpose is absolutely different, patent document 1 discloses a tire in which a wear indicator (a projection) for indicating a replacement timing due to a tire wear is formed in a groove bottom of a main groove, wherein a concave portion is provided in a side surface of the main groove for solving lack of rubber due to the wear indicator, and the rubber corresponding to the concave portion is charged in the wear indicator. It is thought that a depression in the side surface of the main groove does not have a length which is necessary for obtaining traction.

PRIOR ART DOCUMENT

Patent Document

Patent Document 1: Japanese Unexamined Patent Publication No. JP-A-2010-234559

SUMMARY OF THE INVENTION

However, in the structure in which the tie bar connects between a pair of notches, it has been known that a rigidity of the notch portions in the land portion becomes too high in comparison with the other portions, and the wear caused by a rigidity balance of the land portion is generated. Therefore, there is room for further pursuit of wear reduction.

The present disclosure is made by paying attention to the problem mentioned above, and an object of the present disclosure is to provide a pneumatic tire in which its wear resistance is improved.

According to the present disclosure, there is provided a pneumatic tire having main grooves which extend in a tire peripheral direction, and land portions which are sectioned by the main grooves, in a tread portion, the pneumatic tire including: paired notches which face to each other as well as being open to a tread surface, the notches being concave portions which are formed in side surfaces of two land portions which are adjacent across the main grooves; tie bars which protrudes at a predetermined height from groove bottoms of the main grooves and connect between the paired notches; and dimples which are provided in the middle in a width direction of the tie bars, wherein the dimples are arranged at least in a notch internal region which is surrounded by wall surfaces of the notches among the tie bars.

As mentioned above, since the dimple is formed at least in the notch internal region, it is possible to avoid the excessive rising of the rigidity in the vicinity of the notch and it is possible to improve the wear resistance.

Further, in order to improve the wear resistance, it is preferable that the dimples are arranged away from the wall surfaces in a concave side of the notches among the wall surfaces constructing the notches.

As a preferable applied example, there can be listed up that the notches and the tie bars are provided only at one position per one land portion.

Further, it is preferable that the notches and the tie bars are formed in a middle region in the case that the land portions are equally divided among three in the tire peripheral direction, and wherein sipes extending in the tire width direction are formed in the tread surfaces of the land portions, and the sipes are arranged in correspondence to the notches so as to equally divide the tread surfaces of the land portions among three.

As mentioned above, since the sipe is set so that the block (the land portion) is equally divided among three, the rigidities of the respective regions are approximately equal and the uneven wear is reduced. However, in the case that the notch is not provided, the middle region among the three equally divided regions tends to be left after the wear in comparison with the regions which are adjacent to the transverse grooves since the middle region does not have the slits in both sides thereof. Therefore, the notch is formed in the middle region of the block, whereby an area of the middle region of the tread surface becomes smaller in comparison with the regions in both ends, and the pattern which is strong against the uneven wear can be provided by aligning the rigidity in a longitudinal direction of the block between the transverse groove side which tends to slip and the middle side which is hard to move.

DETAILED DESCRIPTION OF THE PREFERRED EMBODIMENTS

A description will be given below of embodiments of the present disclosure. In the drawings, "PD" means a tire peripheral direction, and "WD" means a tire width direction.

Figure 1:
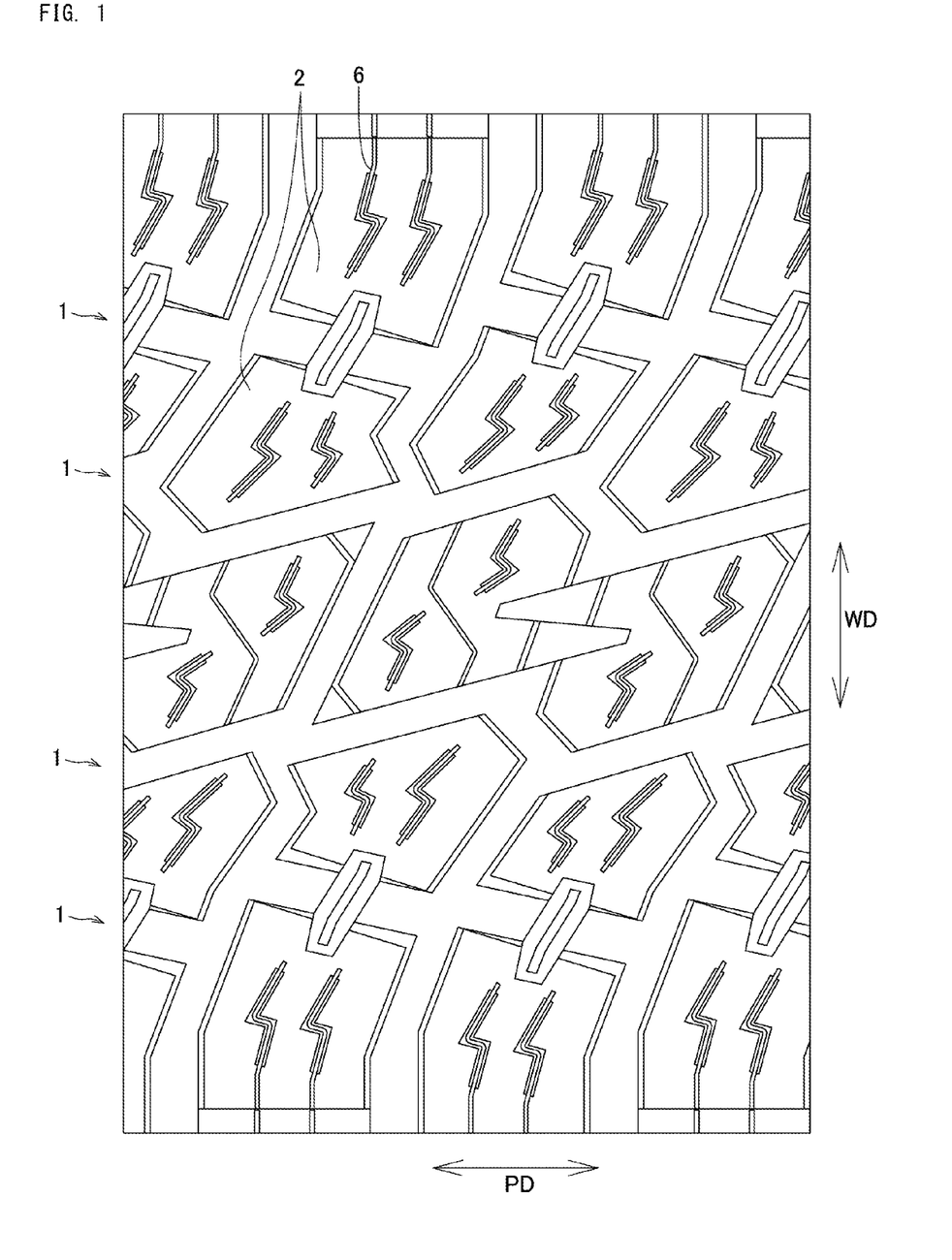
FIG. 1 is a plan view showing a tread pattern in a pneumatic tire of the present disclosure.

A pneumatic tire of the present disclosure is provided with a pair of bead cores, a carcass which winds around the bead cores and is formed into a toroidal shape, a belt layer which is arranged in an outer side in a tire radial direction of a crown portion of the carcass, and a tread portion which is arranged in an outer side in the tire radial direction of the belt layer, in the same manner as the normal pneumatic tire, although an illustration thereof will be omitted. As shown in FIG. 1, main grooves 1 extending at least in the tire peripheral direction PD are formed in the tread portion. In the present disclosure, the main grooves 1 extending in the tire peripheral direction and transverse grooves extending in the tire width direction are formed in the tread portion, and blocks are provided as a land portion in the tread portion.

The main groove 1 extends in a zigzag manner in the tire peripheral direction PD as shown. Of course, the main groove 1 may extend linearly along the tire peripheral direction PD.

Figure 2:
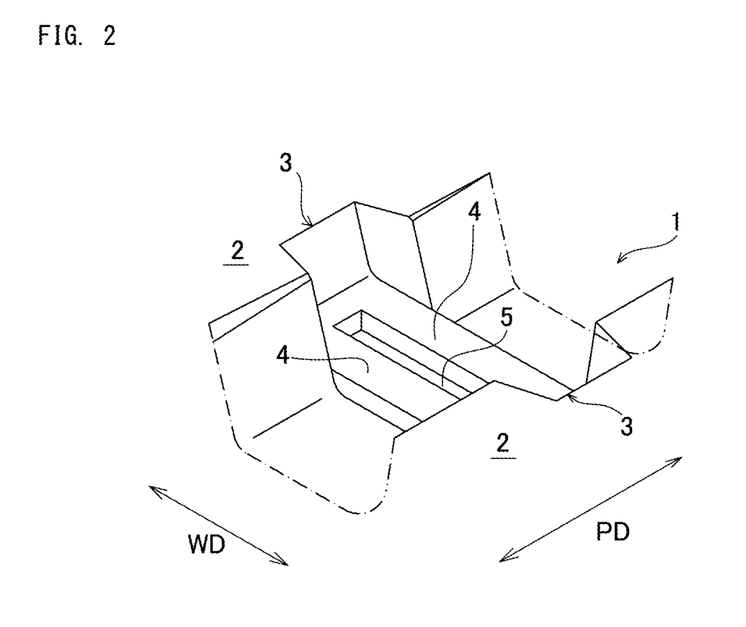
FIG. 2 is an enlarged perspective view showing a notch and a tie bar according to an embodiment in FIG. 1.
Figure 3:
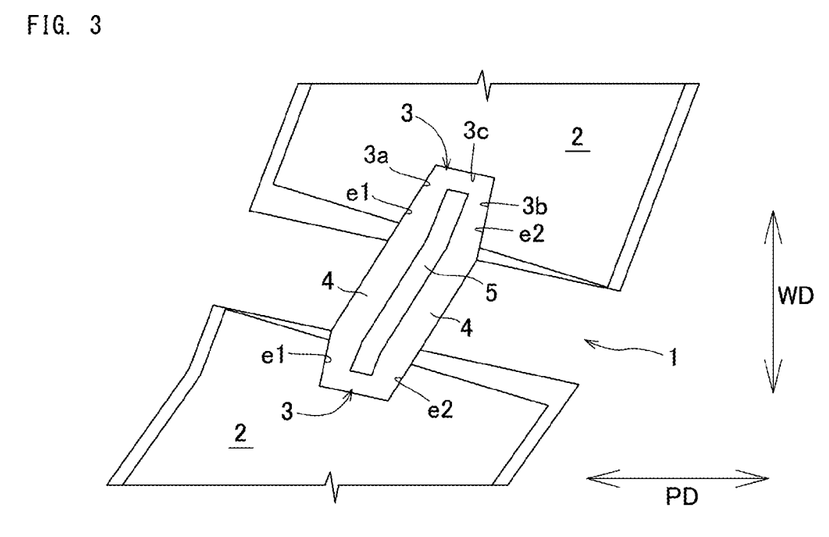
FIG. 3 is an enlarged plan view showing the notch and the tie bar according to the embodiment in FIG. 1.

As shown in FIGS. 1 to 3, paired notches 3 and 3 are formed in side surfaces of two land portions 2 and 2 which are adjacent to each other across the main groove 1, the notches 3 and 3 being concave portions which are open to a tread surface. A pair of notches 3 and 3 face to each other. The notch 3 is formed into a rectangular shape or a trapezoidal shape in a plan view, and has edges (e1, e2) having a length which is necessary for obtaining traction in a direction intersecting the tire peripheral direction PD. The length of the edge is preferably equal to or more than 4 mm.

In the present embodiment, the paired notches are formed in a middle region in the case that the land portion 2 serving as the block is equally divided among three in the tire peripheral direction PD. Further, in the present embodiment, a sipe 6 extending in the tire width direction WD is formed in the land portion 2 (the tread surface). The sipe 6 is arranged at the position which equally divides the land portion 2 (the tread surface) among three, in correspondence to the notch.

Tie bars 4 protruding out of a groove bottom of the main groove 1 at a predetermined height are formed at positions connecting between the paired notches 3. In the present embodiment, the height of the tie bar 4 is set to 15% of a depth of the main groove 1, however, can be appropriately changed. A width of the tie bar is 26% of a width of the block. This corresponds to the notch which is arranged so as to equally divide the block among three. Of course, the width of the tie bar can be changed.

Figure 4:
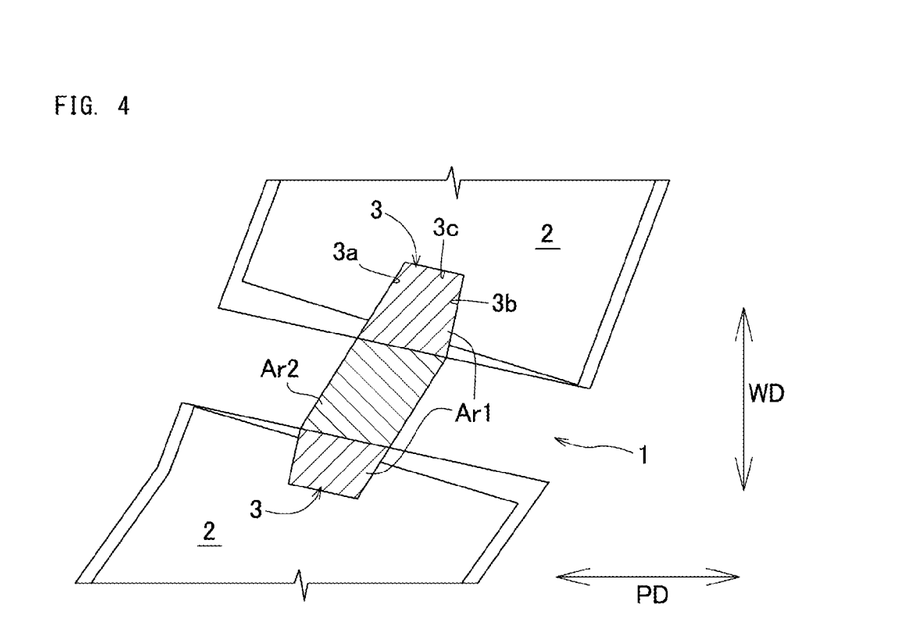
FIG. 4 is an explanatory plan view relating to a peripheral region of the notch and the tie bar according to the embodiment in FIG. 1.

A dimple 5 which is open to the tread surface is formed in the middle in the width direction of the tie bar 4. The dimple 5 is arranged at least in a notch internal region Ar1 (refer to FIG. 4) which is surrounded by wall surfaces (3a, 3b and 3c) of the notch 3 in the tie bar 4. In the example of FIGS. 1 to 3, the dimple 5 is arranged in a main groove region Ar2 (refer to FIG. 4) as well as being arranged in the notch internal region Ar1. The dimple 5 shown in FIGS. 1 to 3 is continuously arranged from the one notch internal region Ar1 to the other notch internal region Ar1 via the main groove region Ar2 except both ends in the longitudinal direction of the tie bar 4. Among the wall surfaces (3a, 3b and 3c) constructing the notch 3, the dimple 5 is arranged away from the wall surface 3c existing in a concave side of the notch 3. As a result, the tie bar 4 connects the notch wall surface 3a existing in one side in the tire peripheral direction PD and the notch wall surface 3b existing in the other side in the tire peripheral direction, and has a support region which supports the both.

The position at which the dimple 5 is arranged can be appropriately changed as long as the dimple 5 is arranged in the notch internal region Ar1. For example, in an example of FIGS. 5 and 6, the dimple 5 is arranged from the concave side wall surface 3c of the one notch 3 to the concave side wall surface 3c of the other notch 3. In an example of FIGS. 7 and 8, the dimple 5 is arranged only in the notch internal region Ar1 of each of the notches 3. In an example of FIGS. 9 and 10, the independent dimple 5 is respectively arranged in the notch internal region Ar1 and the main groove region Ar1.

A width of the dimple 5 is set to 25% of the width of the tie bar 4, however, can be appropriately changed. A depth of the dimple 5 is preferably equal to or deeper than a position of a half height of the tie bar 4.

The pneumatic tire of the present disclosure is the same as the normal pneumatic tire except the provision of the notch 3, the tie bar 4 and the dimple 5 as mentioned above, and any conventionally known materials, shapes, structures and manufacturing methods can be employed in the present disclosure.

EXAMPLES

A description will be given below of examples which specifically show the structures and the effects of the present disclosure. "Wear resistance" was evaluated by the following methods.

The wear resistance was displayed by index number by traveling tires according to examples 1 to 4 and comparative examples 1 and 2 for 12000 km, calculating a ratio of amounts of wear of an edge e2 in a kick-out side and an edge e1 in a step-in side across the notch in the block and setting the comparative example 1 to 100. The smaller the numerical value is, the less the wear is, and thus is preferable.

Comparative Example 1

As shown in FIGS. 11A and 11B, the paired notches 3 and 3 were formed in the side surfaces of the land portions 2 and 2, and the tie bar 4 was arranged between the notches 3 and 3. The dimple is not formed in the tie bar 4.

Comparative Example 2

Figure 12:
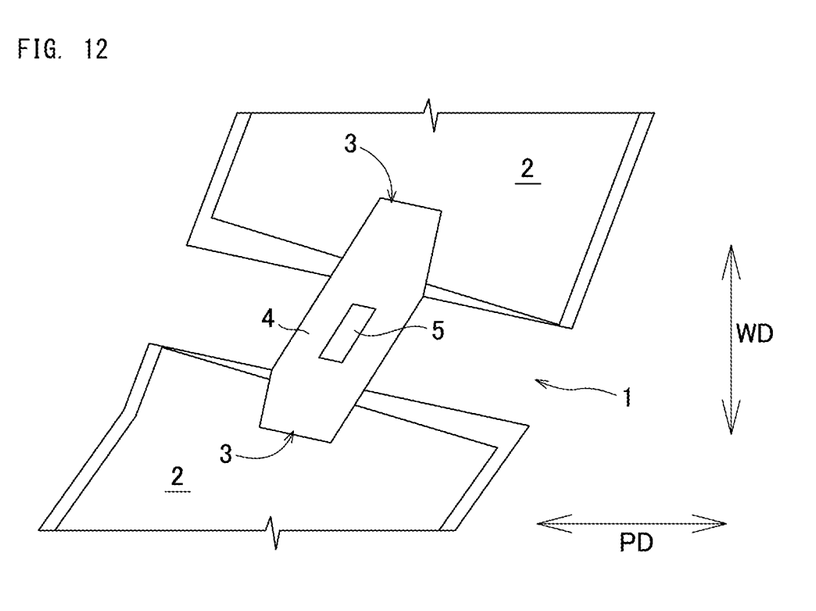
FIG. 12 is an enlarged plan view showing a notch and a tie bar according to a comparative example 2.

As shown in FIG. 12, the dimple 5 was formed in the main groove region Art (refer to FIG. 4) of the tie bar 4. The dimple is not formed in the notch internal region Ar1 (refer to FIG. 4) of the tie bar 4. The rest was set to the same as the comparative example 1.

Example 1

Figure 7:
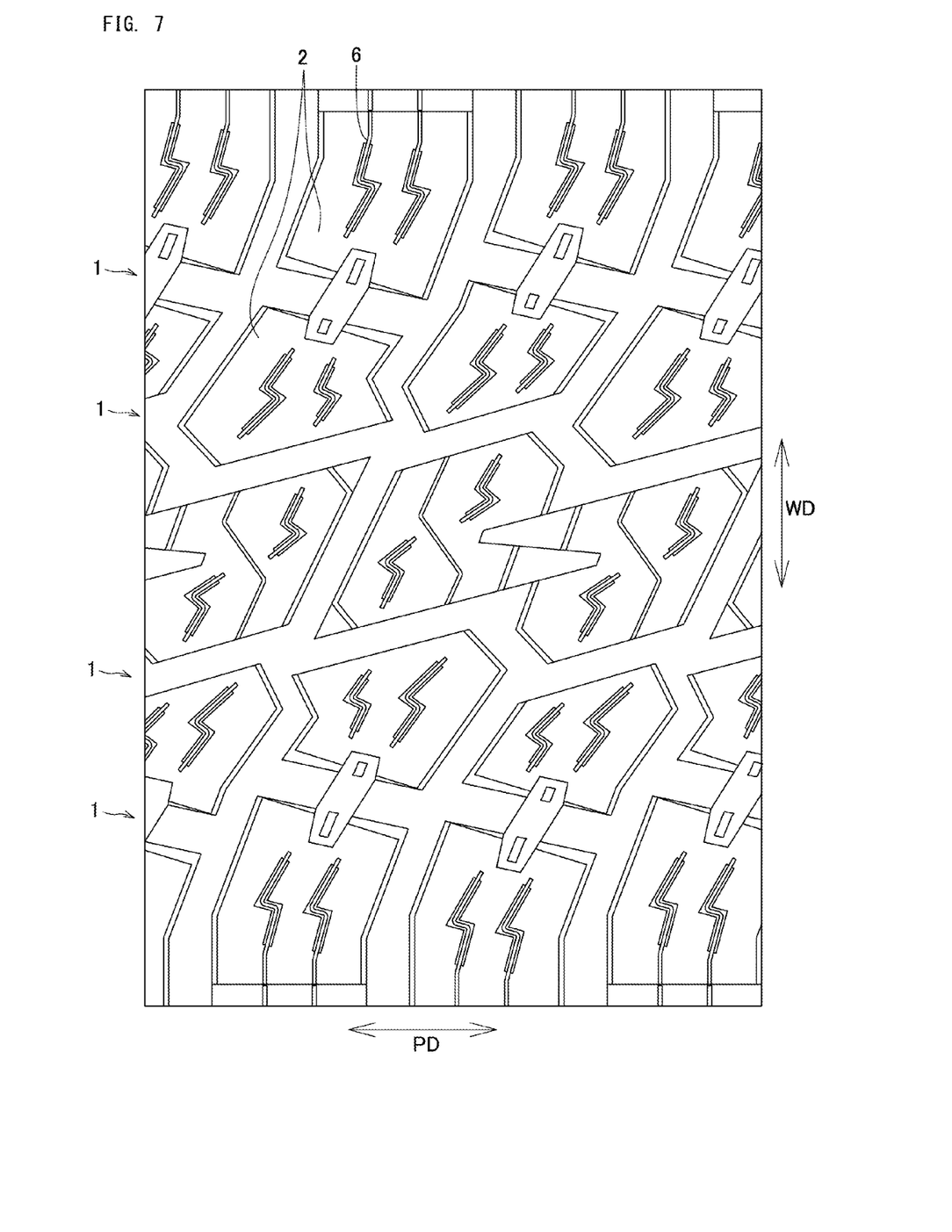
FIG. 7 is a plan view showing a tread pattern according to the other embodiment than the above of the present disclosure.
Figure 8:
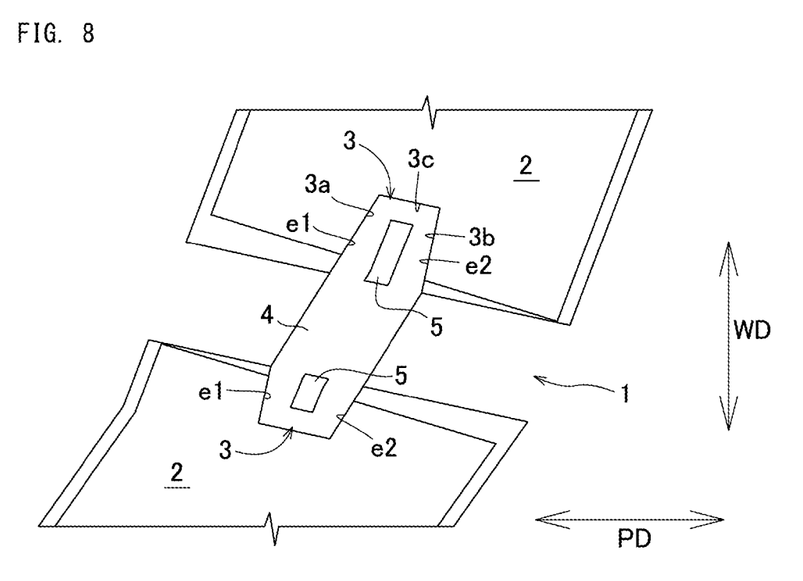
FIG. 8 is an enlarged plan view showing a notch and a tie bar according to the embodiment in FIG. 7.

As shown in FIGS. 7 and 8, the dimple was not formed in the main groove region Ar2 (refer to FIG. 4) of the tie bar 4, but the dimple 5 was formed only in the notch internal region Ar1 (refer to FIG. 4) of the tie bar 4. The dimple 5 is arranged away from the wall surface 3c in the concave side of the notch 3. The rest was set to the same as the comparative example 1.

Example 2

Figure 9:
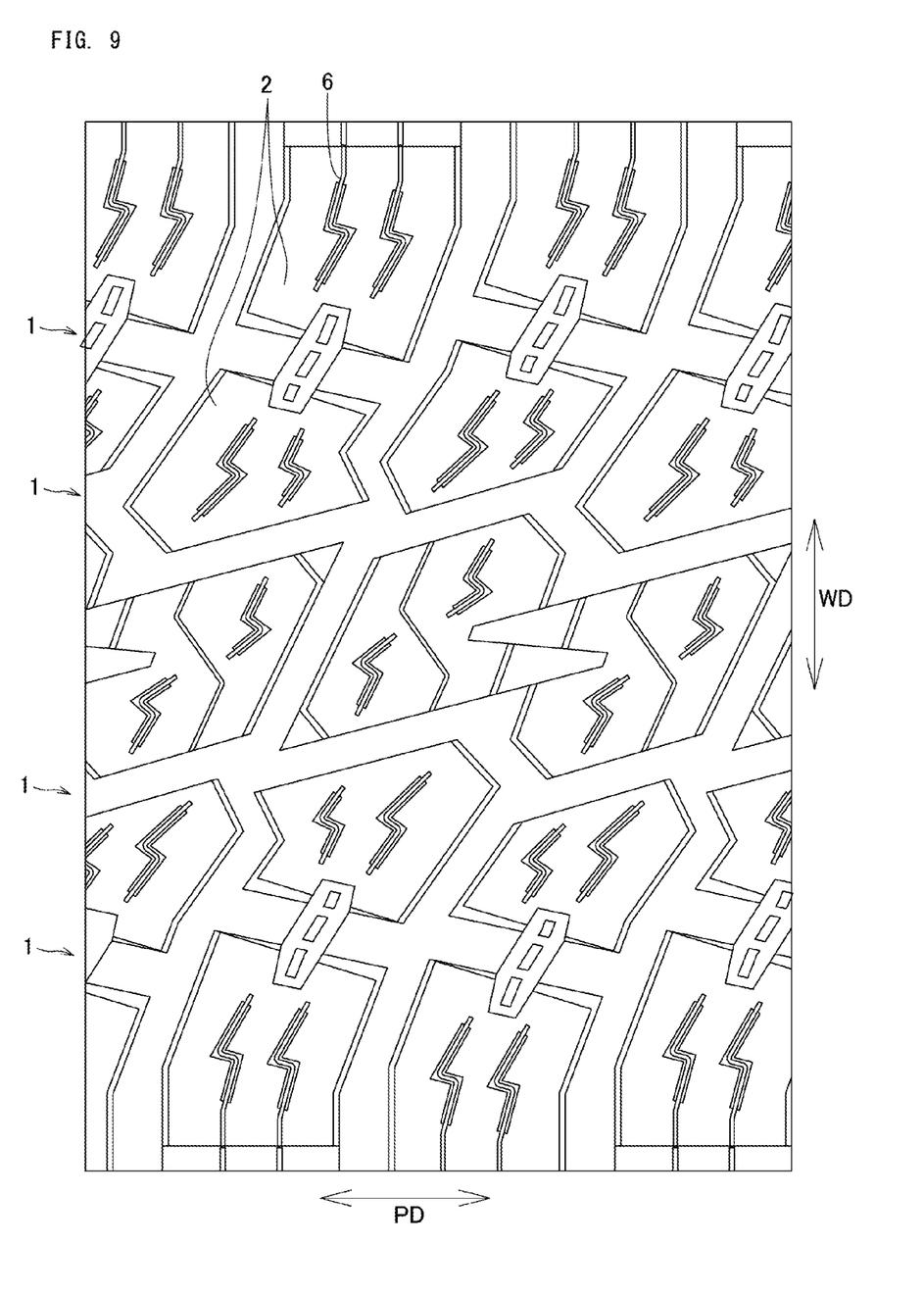
FIG. 9 is a plan view showing an example of a tread pattern according to the other embodiment than the above of the present disclosure.
Figure 10:
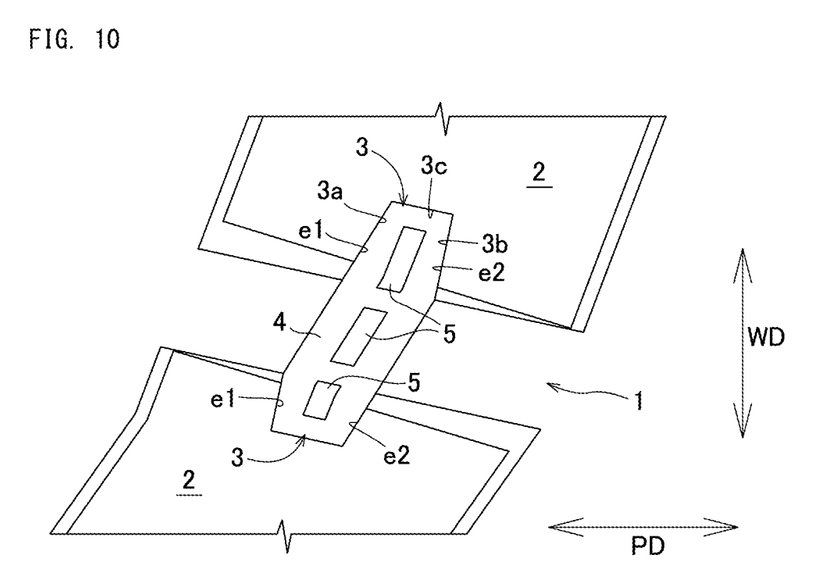
FIG. 10 is an enlarged plan view showing a notch and a tie bar according to the embodiment in FIG. 9.

As shown in FIGS. 9 and 10, the dimple 5 was added to the main groove region Ar2 of the tie bar 4 in relation to the tire according to the example 1, thereby making each of the dimples 5 independent. The rest was set to the same as the example 1.

Example 3

As shown in FIGS. 1 to 3, the dimple 5 was formed from the one notch internal region Ar1 to the other notch internal region Ar1. The dimple 5 is arranged away from the wall surface 3c in the concave side of the notch 3. The rest was set to the same as the example 1.

Example 4

Figure 5:
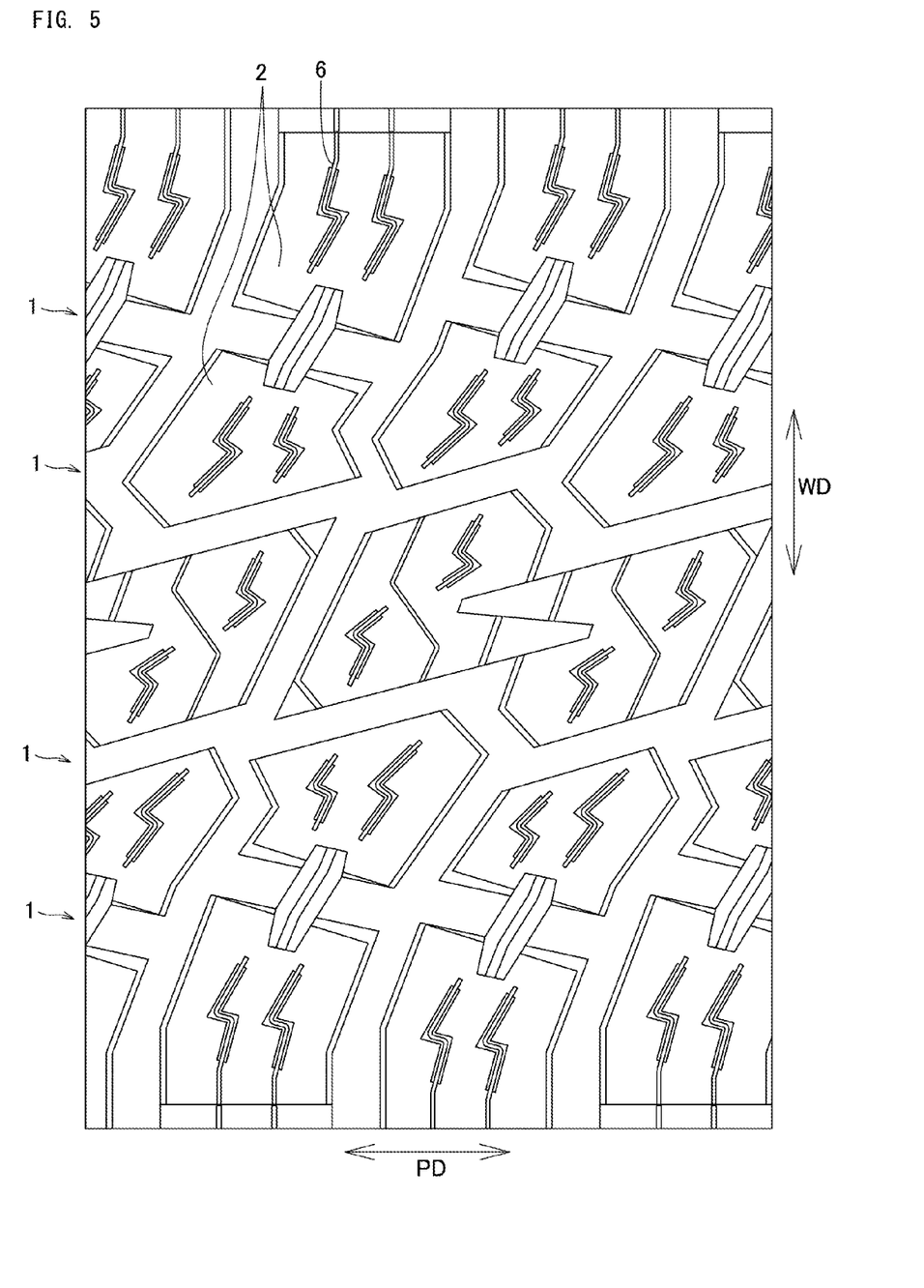
FIG. 5 is a plan view showing a tread pattern according to another embodiment of the present disclosure.
Figure 6:
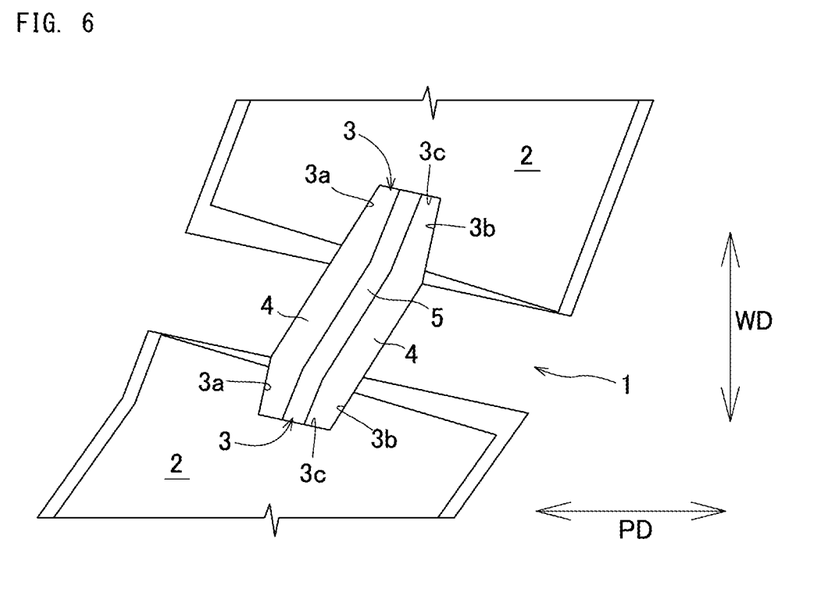
FIG. 6 is an enlarged plan view showing a notch and a tie bar according to the embodiment in FIG. 5.

As shown in FIGS. 5 and 6, the dimple 5 was formed from the wall surface 3c of the one notch 3 to the wall surface 3c of the other notch 3. The rest was set to the same as the example 1.

From the results in Table 1, it is known that the wear resistance is improved in the tires according to the examples 1 to 4 in comparison with the comparative examples 1 and 2. It can be thought that the wear resistance of the examples 2 to 4 is improved in relation to the example 1 since the dimple is provided in the main groove region of the tie bar. It can be thought that the rigidity of the middle portion (the main groove region) of the tie bar is lowered by the dimple and the balance with the rigidity of the main grooves in both sides in the tire peripheral direction of the tie bar is improved. It can be thought that the wear resistance of the example 3 is better than the example 4 since the region supporting the edges across the notch preferably exists in the tie bar.

The description is given above of the embodiments according to the present disclosure with reference to the accompanying drawings, however, the specific structure should not be limited to these embodiments. The scope of the present disclosure is shown by claims as well as the description of the embodiments mentioned above, and includes all the changes within the equivalent meanings and scope of claims.

It is possible to apply the structure employed in each of the embodiments to the other optional embodiment. The particular structure of each of the portions is not limited to the embodiments mentioned above, but can be variously modified within a range which does not deviate from the scope of the present disclosure.

What is claimed is:

1. A pneumatic tire having main grooves which extend in a tire peripheral direction, and land portions which are sectioned by the main grooves, in a tread portion, the pneumatic tire comprising:
    paired notches which face to each other as well as being open to a tread surface, the notches being concave portions which are formed in side surfaces of two land portions which are adjacent across the main grooves;
    tie bars which protrudes at a predetermined height from groove bottoms of the main grooves and connect between the paired notches; and
    dimples which are provided in the middle in a width direction of the tie bars,
    wherein the dimples are arranged at least in a notch internal region which is surrounded by wall surfaces of the notches among the tie bars, and
    wherein the dimples are arranged away from the wall surfaces in a concave side of the notches among the wall surfaces constructing the notches.

2. The pneumatic tire according to claim 1, wherein the notches and the tie bars are provided only at one position per one land portion.

TABLE 1

|  | Comparative example 1 | Comparative example 2 | Example 1 | Example 2 | Example 3 | Example 4 |
|---|---|---|---|---|---|---|
| Wear resistance | 100 | 100 | 98 | 97 | 96 | 97 |

3. The pneumatic tire according to claim 1, wherein the notches and the tie bars are formed in a middle region and the land portions are equally divided among three in the tire peripheral direction, and wherein sipes extending in the tire width direction are formed in the tread surfaces of the land portions, and the sipes are arranged in correspondence to the notches so as to equally divide the tread surfaces of the land portions among three.

\* \* \* \* \*